United States Patent
Horn et al.

(10) Patent No.: US 8,842,702 B2
(45) Date of Patent: Sep. 23, 2014

(54) CONTROL INDICATIONS FOR SLOTTED WIRELESS COMMUNICATION

(75) Inventors: Gavin Bernard Horn, San Diego, CA (US); Ashwin Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 466 days.

(21) Appl. No.: 11/779,201

(22) Filed: Jul. 17, 2007

(65) Prior Publication Data

US 2009/0022173 A1   Jan. 22, 2009

(51) Int. Cl.
*H04J 3/06* (2006.01)
*H04B 7/26* (2006.01)

(52) U.S. Cl.
CPC .............. *H04B 7/2656* (2013.01); *H04J 3/0602* (2013.01)
USPC ....................................................... 370/512

(58) Field of Classification Search
CPC ........................................ H04J 3/0602
USPC ......... 370/336, 337, 347, 349, 508, 350, 509, 370/512–514; 455/13.2, 3.02, 12.1, 427, 455/502; 375/341, 340, 344
See application file for complete search history.

(56) References Cited

U.S. PATENT DOCUMENTS

| | | | |
|---|---|---|---|
| 4,978,930 A | 12/1990 | Suter | |
| 6,920,115 B2 | 7/2005 | Molko | |
| 6,934,752 B1 * | 8/2005 | Gubbi | 709/225 |
| 7,006,848 B2 * | 2/2006 | Ling et al. | 455/562.1 |
| 7,072,307 B2 * | 7/2006 | Tong et al. | 370/253 |
| 7,187,903 B1 * | 3/2007 | Febvre et al. | 455/13.2 |
| 7,620,014 B1 * | 11/2009 | Marques-Pucheu et al. | 370/330 |
| 2002/0009065 A1 * | 1/2002 | Molko | 370/337 |
| 2002/0089933 A1 * | 7/2002 | Giroux et al. | 370/236 |
| 2002/0152324 A1 * | 10/2002 | Sherman | 709/245 |
| 2003/0073435 A1 * | 4/2003 | Thompson et al. | 455/428 |
| 2004/0190469 A1 * | 9/2004 | Pekonen et al. | 370/328 |
| 2005/0128017 A1 | 6/2005 | Meltzer | |
| 2007/0105574 A1 | 5/2007 | Gupta et al. | |
| 2007/0109988 A1 | 5/2007 | Sampath | |
| 2007/0268846 A1 * | 11/2007 | Proctor et al. | 370/279 |

FOREIGN PATENT DOCUMENTS

| | | |
|---|---|---|
| CN | 101061649 A | 10/2007 |
| EP | 1035667 | 9/2000 |
| EP | 1936850 A1 | 6/2008 |
| WO | WO9912273 | 3/1999 |

(Continued)

OTHER PUBLICATIONS

Partial European Search Report—EP08006478, Search Authority—The Hague, Jan. 21, 2009.

(Continued)

*Primary Examiner* — Mark Rinehart
*Assistant Examiner* — Christopher R Crompton
(74) *Attorney, Agent, or Firm* — Dang M. Vo

(57) ABSTRACT

Multiple control indications are transmitted within timeslots defined for a slotted communication system. For example, a wireless node may transmit a control indication at a beginning of a timeslot and at an end of a timeslot. A control indication may comprise a resource utilization message that a node generates in an attempt reduce inference at the node that is caused by transmissions by neighboring nodes. A node also may synchronize to a received timeslot of another node based on the position of one or more control indications within the timeslot. Here, each control indication may include information that indicates the position of the control indication within the timeslot.

79 Claims, 9 Drawing Sheets

(56) References Cited

FOREIGN PATENT DOCUMENTS

| WO | WO0057581 | 9/2000 |
| WO | WO00/72473 A1 * | 11/2000 |
| WO | 2004032380 | 4/2004 |
| WO | WO2005101664 | 10/2005 |
| WO | WO2007052767 A1 | 5/2007 |

OTHER PUBLICATIONS

International Search Report—PCT/US2008/070203, International Searching Authority—European Patent Office, Jun. 17, 2009.
European Search Report—EP08006478—Search Authority—The Hague—Jun. 9, 2009.
Written Opinion—PCT/US2008/070203—ISAEPO—Jun. 17, 2009.
Taiwan Search Report—TW097127186—TIPO—May 8, 2012.

* cited by examiner

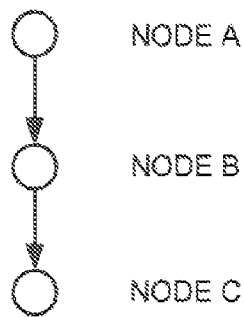
FIG. 2A
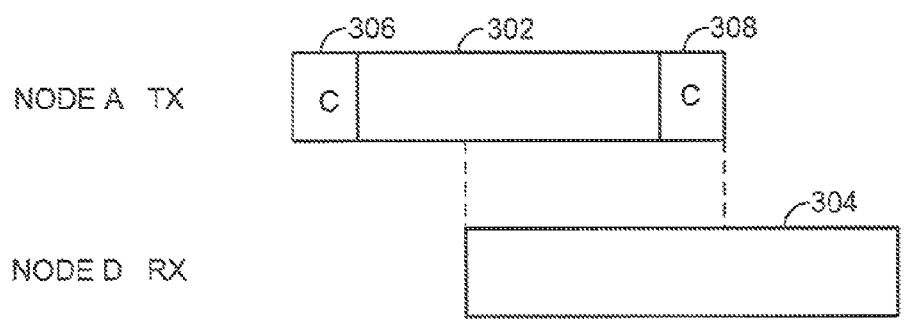
FIG. 2B
FIG. 3

CONTROL INDICATIONS FOR SLOTTED WIRELESS COMMUNICATION

BACKGROUND

1. Field

This application relates generally to wireless communication, and more specifically but not exclusively to the use of multiple control indications in wireless communication timeslots.

2. Background

Various network topologies may be employed to establish wireless communication. For example, a wide area network, a local area network, or some other type of network may be deployed depending on the desired wireless communication capabilities.

A wireless wide area network is typically a planned deployment within a licensed frequency band. Such a network may be designed to optimize spectral efficiency and quality of service to support a large number of users. A cellular network is one example of a wireless wide area network.

A wireless local area network is often deployed without centralized planning. For example, such a network may be deployed in an ad hoc manner in unlicensed spectrum. Consequently, this type of network may be used to support a single user or a small number of users. A Wi-Fi network is one example of a wireless local area network.

In practice, each of the above networks has various disadvantages due to tradeoffs that may be made to provide a given type of service. For example, due to the complexity of centralized planning, setting up a wireless wide area network may be relatively expensive and time consuming. Hence, such a scheme may not be well suited for "hot spot" deployments. On the other hand, an ad hoc wireless local area network may not achieve the same level of spatial efficiency (bits/unit area) as a planned network. Moreover, to compensate for potential interference between nodes in the network, an ad hoc scheme may employ interference mitigation techniques such as carrier sense multiple access. In practice, however, interference mitigation techniques such as these may lead to poor utilization, limited fairness control, and susceptibility to hidden and exposed nodes.

United States Patent Application Publication No. 2007/0105574 describes a system that may provide various advantages over certain aspects of conventional wide area network and personal area network deployments. In some aspects the system employs timeslot-based communication where multiple wireless nodes in the system may simultaneously transmit and receive during designated timeslots.

Fair-sharing of a wireless channel in the system is facilitated by joint scheduling of a transmission by a transmitter of one node and a receiver of another node through the use of a resource utilization message ("RUM"). Here, a transmitting node may request a set of resources based on knowledge of availability in its neighborhood and a receiving node may grant some or all of the requested channels based on knowledge of availability in its neighborhood. For example, the transmitting nodes may learn of availability by listening to receiving nodes in its vicinity and the receiving node may learn of potential interference by listening to transmitting nodes in its vicinity. In the event the receiving node is affected by interference from neighboring transmitting nodes the receiving node may transmit a RUM in an attempt to cause the neighboring transmitting nodes to stop their interfering transmissions. According to related aspects, RUMs may be weighted to indicate not only that a receiving node is disadvantaged (e.g., due to the interference it sees while receiving) and desires a collision avoidance mode of transmission, but also the degree to which the receiving node is disadvantaged.

A transmitting node that receives a RUM may utilize the fact that it has received a RUM, as well as the weight thereof, to determine an appropriate response. For example, the transmitting node may elect to abstain from transmitting, it may reduce its transmit power during one or more designated timeslots, or it may ignore the RUM for instance if it has received a RUM from its own receiver that indicates its own receiver is more disadvantaged. The advertisement of weights may thus provide a collision avoidance scheme that is fair to all nodes in the system.

SUMMARY

A summary of sample aspects of the disclosure follows. It should be understood that any reference to aspects herein may refer to one or more aspects of the disclosure.

The disclosure relates in some aspects to transmitting multiple control indications within a timeslot defined for a slotted communication system. For example, a wireless node may transmit control indications at a beginning of a transmit timeslot and at an end of the transmit timeslot. In this way another wireless node that is listening for control indications during its receive timeslot may receive at least one of the control indications, even if the timeslots of the nodes are not synchronized. For example, a receive timeslot of a first node may commence some time after the commencement of a transmit timeslot of a second node. In this case, even though the first node may not receive a control indication that the second node transmitted at the beginning of its transmit timeslot, the first node may receive a control indication that the second node transmitted at the end of its transmit timeslot.

In some aspects a control indication comprises an interference management message and/or a resource management message. For example, a control indication may take the form of a RUM that a node transmits in an attempt to reduce the interference it experiences during receive operations, where the interference is believed to be caused by transmissions of neighboring nodes. At a basic level a RUM may simply indicate that a RUM-sending node is disadvantaged in some way. In addition, the RUM may include an indication as to the extent to which the RUM-sending node is disadvantaged (e.g., the degree to which reception of data at the RUM-sending node is falling below an expected or desired level).

Each of the neighboring nodes is configured to regularly scan for RUMs and determine, based on the RUMs, whether to limit transmission during a subsequent timeslot. For example, if a given RUM-sending node is more disadvantaged than a RUM-sending node currently associated with a particular RUM-receiving node, that RUM-receiving node may abstain from transmitting or transmit at a lower power level during an upcoming timeslot so that the more disadvantaged RUM-sending node may more effectively receive its data during that timeslot.

The disclosure relates in some aspects to synchronizing to a timeslot of another node (e.g., referred to herein, for convenience, as a received timeslot) based on a position of one or more control indications within the received timeslot. Here, a control indication may comprise information that is indicative of the position of the control indication within the received timeslot. For example, the information may indicate that the control indication is near a beginning or an end of the received timeslot. A node that receives the timeslot, and hence the control indications, may thereby readily synchronize its timeslots to the received timeslot since the node will have information indicative of the timing of the beginning and/or end of the received timeslot.

BRIEF DESCRIPTION OF THE DRAWINGS

These and other features, aspects and advantages of the disclosure will be more fully understood when considered with respect to the following detailed description, appended claims, and accompanying drawings, wherein:

FIG. 2, including FIGS. 2A and 2B, is a simplified diagram of several sample aspects of slotted communication;

FIG. 3 is a simplified diagram of several sample aspects of asynchronous slotted communication;

Figure 1:
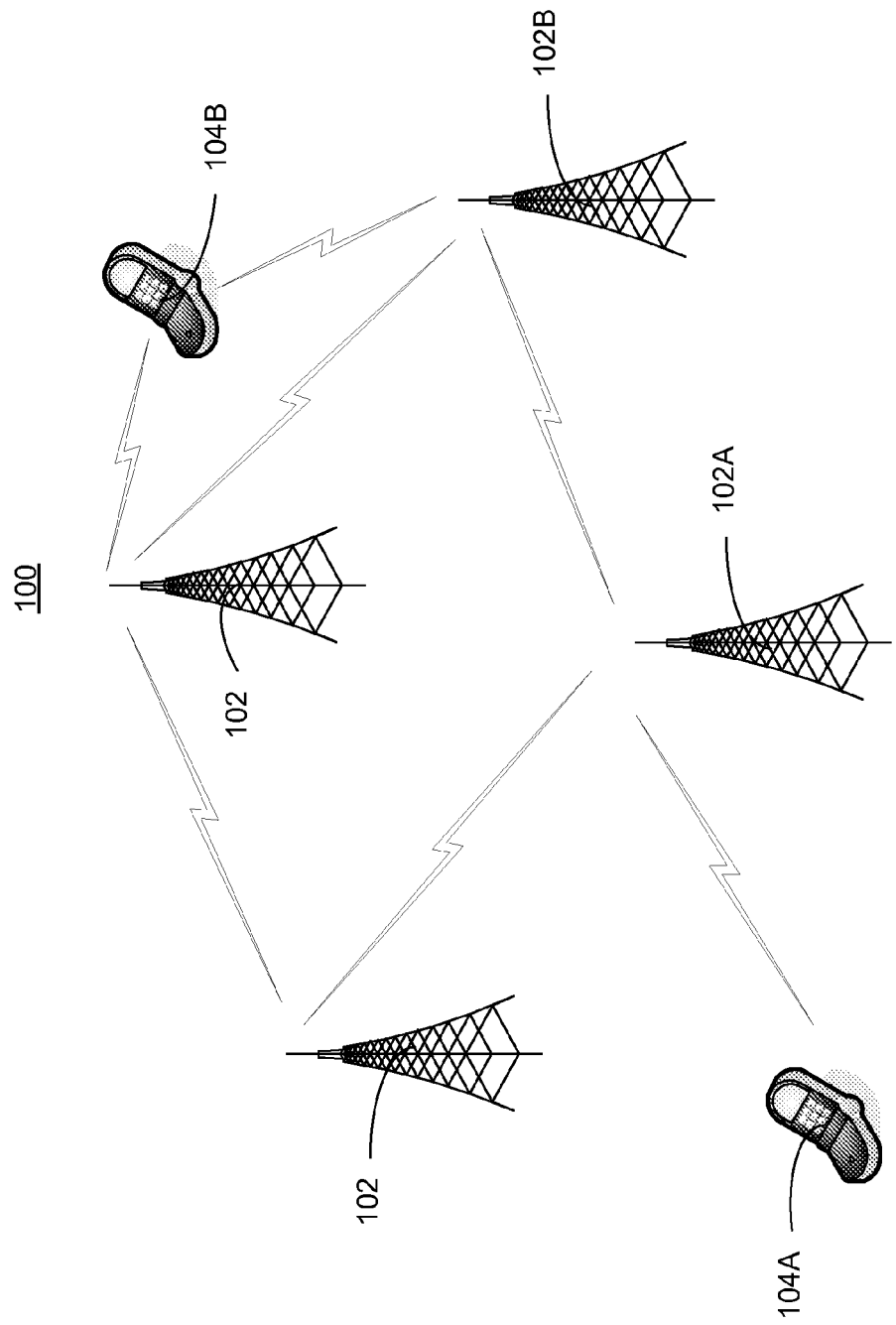
FIG. 1 is a simplified diagram of several sample aspects of a wireless communication system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

As an example of the above, in some aspects a method for wireless communication comprises defining timeslots for slotted communication and transmitting, in each of at least one portion of the timeslots, data and at least two instances of a control indication, wherein each instance of the control indication is independently encoded and transmitted. Here, in some aspects each control indication may comprise a resource utilization message while in other aspects each control indication may comprise information that facilitates synchronization with the timeslots.

FIG. 1 illustrates several sample aspects of a wireless communication system 100. The system 100 includes several wireless nodes, generally designated as nodes 102 and 104. A given node may receive one or more traffic flows, transmit one or more traffic flows, or both. For example, each node may comprise at least one antenna and associated receiver and transmitter components. In the discussion that follows the term receiving node may be used to refer to a node that is receiving and the term transmitting node may be used to refer to a node that is transmitting. Such a reference does not imply that the node is incapable of performing both transmit and receive operations.

In some implementations a node may comprise an access terminal, a relay point, or an access point. For example, the nodes 102 may comprise access points or relay points and the nodes 104 may comprise access terminals. In a typical implementation the access points 102 provide connectivity for a network (e.g., a Wi-Fi network, a cellular network, a WiMax network, a wide area network such as the Internet, and so on). A relay point 102 may provide connectivity to another relay point or to an access point. For example, when an access terminal (e.g., access terminal 104A) is within a coverage area of a relay point (e.g., relay point 102A) or an access point (e.g., access point 102B), the access terminal 104A may be able to communicate with another device connected to the system 100 or some other network.

In some aspects the system 100 may employ slotted communication. For example, communication between nodes in the system 100 may be accomplished through the use of designated timeslots. In general, the teachings herein may relate to improvements in asynchronous slotted communication. In addition, these teachings also may be applicable to synchronous slotted communication and other forms of communication.

FIG. 2 illustrates a simplified example of traffic flow associated with transmit timeslots and receive timeslots. Referring to FIG. 2A, in this example one flow of traffic is from a node A (e.g., node 104A in FIG. 1) to a node B (e.g., node 102A) and then to a node C (e.g., node 102B). Each of the nodes A, B, and C are allowed to transmit or to receive during certain timeslots. For example, referring to FIG. 2B, nodes A and C transmit during odd numbered timeslots and node B transmits during even numbered timeslots. Conversely, nodes A and C receive during even numbered timeslots and node B receives during odd numbered timeslots. As illustrated by the relative alignment of the timeslots of FIG. 2B, the timeslots for the nodes A, B, and C are synchronized.

The use of timeslots as described in FIG. 2B may provide increased spectral efficiency and reduce the amount of interference in a wireless system. For example, if the nodes that transmit during the same timeslot are spaced a sufficient distance apart they may be able to successfully transmit to their receiving nodes without causing undue interference at other receiving nodes.

Moreover, interference management techniques may be employed to further reduce the possibility of interference between nodes. As will be discussed in more detail below, the nodes in the system may transmit control indications that are used to reduce the amount of interference seen by a given node. For example, a node that is experiencing interference when it is trying to receive data from a particular node may transmit a control indication requesting that other nodes refrain from transmitting or reduce their transmit power when the receiving node is receiving data. To this end, nodes that have data to transmit are configured to regularly scan for such control indications from nodes that are expecting to receive data.

As mentioned above, in FIG. 2B the timeslots for nodes A, B, and C are synchronized in that the timeslots commence and end at the same time. In such an implementation, a specific period of time within a timeslot may be designated for the transmission of a control indication. In this case, nodes that have data to transmit may scan for control indications at the designated period of time during a timeslot to determine whether any receiving nodes are requesting transmitting nodes to limit their transmissions. This method of interference avoidance may be employed across a synchronous system. That is, any node in the synchronous system may monitor for control indications at the designated times to readily determine whether there are any associated or non-associated receiving nodes that are requesting the transmitting nodes to limit their transmissions.

In contrast, in asynchronous implementations where the timeslots of non-associated nodes are not synchronized, the control indication transmitted by a node may not be readily obtained by another non-associated node. For example, in an asynchronous system the timeslots for a set of nodes A and D may not commence and end at the same time. Hence, if node A transmits a control indication at the beginning of its timeslot, node D may not receive the control indication if its receive timeslot commences at a later point in time.

Referring to FIG. 3, in some aspects a node may be configured to transmit several instances of a control indication during a transmit timeslot 302 to facilitate reception of the control indication during a receive timeslot 304 of another node. For example, node A may transmit control indications 306 and 308 near the beginning and the end of the timeslot 302, respectively. In this case, although node D will not receive the control indication 306 during its receive timeslot 304, node D will receive the control indication 308. In this case, however, node D may not know exactly when the control indication is being transmitted due to the asynchronous timing between the nodes. Consequently, node D may be configured to scan during its entire receive timeslot 304 to acquire the control indication.

In general, control indications may be transmitted at any time during the transmit timeslot. In a typical implementation a node transmits a first instance of a control indication near (e.g., at or close to) the beginning of the transmit timeslot and then transmits a second instance of the control indication near the end of the transmit timeslot. In this way, a node that is close enough to receive this information may be able to receive the control indication over a wide range of timing offsets between the transmit and receive timeslots. For example, if the instances of the control indication are transmitted at the beginning and the end of the transmit timeslot and the control indication is relatively short in duration, a receive timeslot that barely overlaps the transmit timeslot in time may still enable reception of the control indication.

In some aspects a node may use a received control indication to synchronize that node's receive or transmit timeslots with the transmit timeslots of another node. For example, the node that received the control indication may utilize information regarding the location of the control indication within the transmit timeslot to determine when the transmit timeslot begins and ends. This node may then adjust its receive or transmit timeslot to begin and end at the same time as the transmit timeslot.

In some implementations a control indication includes information that is indicative of the location of the control indication within the transmit timeslot. For example, a first instance of a control indication may include information that indicates that it is near (e.g., at) the beginning of the timeslot. Similarly, a second instance of the control indication may include information that indicates that it is near (e.g., at) the end of the timeslot.

Additional examples of the use of multiple control indications in a timeslot will be discussed in conjunction with FIGS. 4-7. These figures illustrate, in a simplified manner, various signal timing relationships of nodes that use a request/grant scheme and control indications to efficiently share a communication medium.

Figure 4:
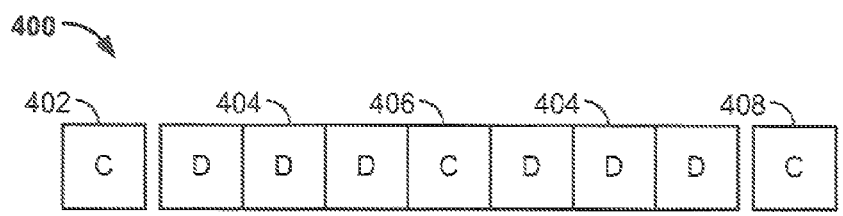
FIG. 4 is a simplified diagram of several sample aspects of a timeslot.

FIG. 4 illustrates a sample format for a timeslot 400. Nodes may thus communicate over a given frequency band by transmitting and receiving data at defined timeslot intervals according to the timeslot structure. A control channel 402 is defined at the beginning of the timeslot 400. The control channel 402 is followed by a data channel designated by the blocks 404 labeled with the letter "D." Another control channel 406 follows a first portion of the data channel 404. Finally, a control channel 408 is defined at the end of the timeslot 400. In general, the control indication referenced herein may comprise any information that may be transmitted over one or more control channels. Such information may comprise a portion of a message, an entire message or multiple messages.

In some implementations guard bands are defined between various channels of the timeslot. FIG. 4 illustrates an example where one guard band is defined between the control channel 402 and the data channel 404 and another guard band is defined between the control channel 408 and the data channel 404. Such guard bands may be employed to enable the timeslots to be dynamically designated as transmit timeslots or receive timeslots. For example, when a receive timeslot is re-designated as a transmit timeslot, a node may continue to scan during one or more of the control channels (e.g., to listen for RUMs). The guard band thus provides a defined period of time within which a node may switch its transceiver from a transmit mode to a receive mode or vice versa.

In some implementations multiple timeslot channels may be established over different frequency bands. In this way, the nodes in a system may simultaneously transmit and/or receive data via several timeslot channels. In addition, in some implementations a separate control channel may be established over another (e.g., dedicated) frequency band. Such a control channel may have a relatively low reuse factor (e.g., ¼ or smaller) to reduce the impact of any potential interference on the control information.

It should be appreciated that the timeslot 400 is but one example of a suitable timeslot structure. Thus, the teachings herein are applicable to various forms of slotted communication that may employ, for example, different types of timeslot structures, differing timeslot lengths, various types of data channels and control channels, and various time division multiplexing and frequency division multiplexing schemes.

Figure 5:
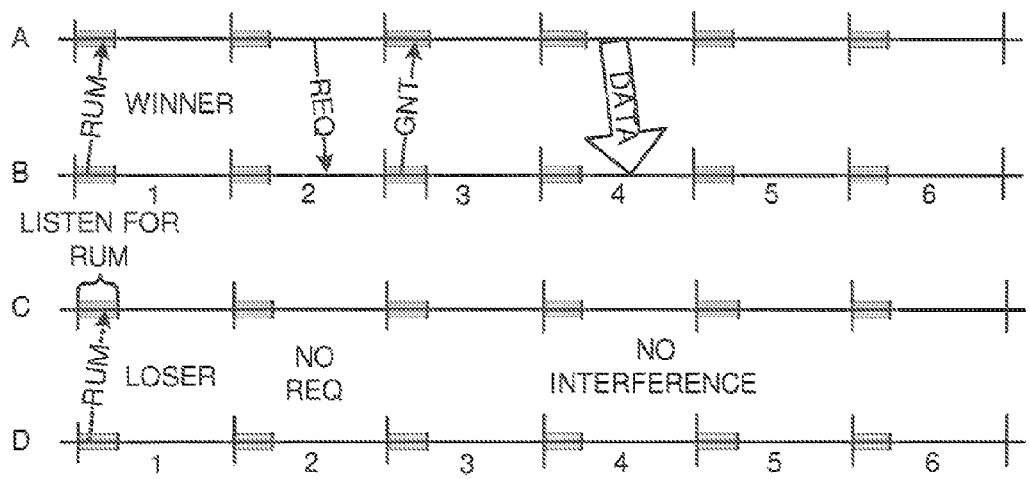
FIG. 5 is a simplified timing diagram of several sample aspects of synchronous slotted communication.

Sample functionality relating to the use of the channels of the timeslot 400 will now be described in conjunction with FIGS. 5-7. To simplify the initial discussion relating to the request/grant scheme, several basic concepts will be treated in the context of a synchronous system as represented by FIG. 5. In addition, for convenience the discussion that follows may simply refer to the use of RUMs. It should be appreciated, however, that other forms of control indications may be applicable here as well.

FIG. 5 depicts timing relating to two pairs of nodes, nodes A and B and nodes C and D. Nodes A and B are associated with one another to enable node A to transmit to node B, and vice versa. Similarly, nodes C and D are associated with one another to enable node C to transmit to node D, and vice versa. FIG. 5 further illustrates that the timeslots of associated nodes A and B are synchronized with the timeslots of associated nodes C and D.

The nodes may be configured to alternately communicate via timeslots in a similar manner as described above in conjunction with FIG. 2. In this case, nodes A and C transmit during even numbered timeslots and receive during odd numbered timeslots. Conversely, nodes B and D receive during even numbered timeslots and transmit during odd numbered timeslots.

The nodes employ a request/grant scheme to control when a node is allowed to transmit data. For example, when node A wishes to transmit data to node B, node A transmits a request during one of its transmit timeslots (e.g., timeslot 2). This message may comprise a request to transmit over one or more channels. In the timeslot example of FIG. 4, this request may be sent via the control channel 406.

Node B receives the request during its corresponding receive timeslot. In response to the request, node B may transmit a grant ("GNT") during one of its transmit timeslots (e.g., timeslot 3). Here, node B may grant all or a subset of the channels requested by node A. For example, node B may not grant channels that have recently exhibited a relatively high level of interference. In the example of FIG. 4, this grant may be sent via the control channel 402.

In some aspects, in conjunction with the above operations node A may transmit a pilot message (e.g., a signal having a known signal strength). Node B may use the pilot message to determine at rate at which node A should transmit its data. In some implementations node B sends this rate information to node A with the grant.

After receipt of the grant during its corresponding receive timeslot, node A transmits the data (e.g., via the data channel 404 of FIG. 4) during one of its transmit timeslots (e.g., timeslot 4). Node B will thus receive the data during its corresponding receive timeslot.

In practice, the nodes may be in relatively close proximity to one another such that transmissions by a node of one node pair may interfere with reception by a node of the other node pair. Accordingly, the nodes also employ an interference management scheme whereby a node that is experiencing degradation in service due to interfering transmissions from one or more nearby transmitting nodes may send out a control indication that requests that the transmitting nodes limit their transmissions.

In some implementations the control indication comprises a RUM. Briefly, each node that is experiencing degradation in service may transmit a RUM during one of its transmit timeslots (e.g., timeslot 1). Such a node may be referred to herein as a RUM-sending node. Any nearby node that receives during this timeslot (e.g., the nodes that transmit during even numbered timeslots) may potentially receive the RUM transmitted by each RUM-sending node. Such a node may be referred to herein as a RUM-receiving node. Each RUM-receiving node may then make a decision as to whether to limit its transmissions based on all of the RUMs it receives. As will be discussed in more detail below, each RUM may include weight information that may be used to determine which RUM-sending node is more disadvantaged.

Referring to the specific example of FIG. 5, both nodes B and D may transmit RUMs during a defined time period within timeslot 1. For example, the shaded portion at the beginning of each timeslot may represent the timing of a control channel for the timeslot. A node that receives during timeslot 1 (e.g., node A) may thus be configured to scan for RUMs during this time period. Upon receipt of the RUMs from nodes B and D, nodes A and C may determine that node B is more disadvantaged than node D. In other words, node B may be designated as the winner of this particular contention for resources and node D designated as the loser. As will be discussed in more detain below, this determination may be based on a comparison of information from each RUM that is indicative of a degree to which data reception at a node is being adversely affected by interfering transmissions from at least one other node.

In the event node D does not win the contention for resources, its associated transmitting node (node C) may limit its planned transmission for timeslot 4. For example, as shown in FIG. 5 node C may abstain from sending a request in timeslot 2 to transmit data to node D.

Conversely, since node B won the contention for resources, its associated transmitting node (node A) will send a request in timeslot 2 to initiate transmission of data in timeslot 4. Advantageously, due to the lack of a corresponding request in timeslot 2 from node C, there will not be any potentially interfering transmissions from node C during timeslot 4. Additional details relating to the generation and characteristics of RUMs and associated operations will be discussed later in this disclosure.

As noted above, FIG. 5 relates to a synchronous system where the timeslots for nodes A-D are aligned. Additional aspects of the use of multiple control indications where the timeslots of different sets of nodes are not time aligned (e.g., as in an asynchronous system) will now be discussed in conjunction with FIGS. 6 and 7.

Figure 6:
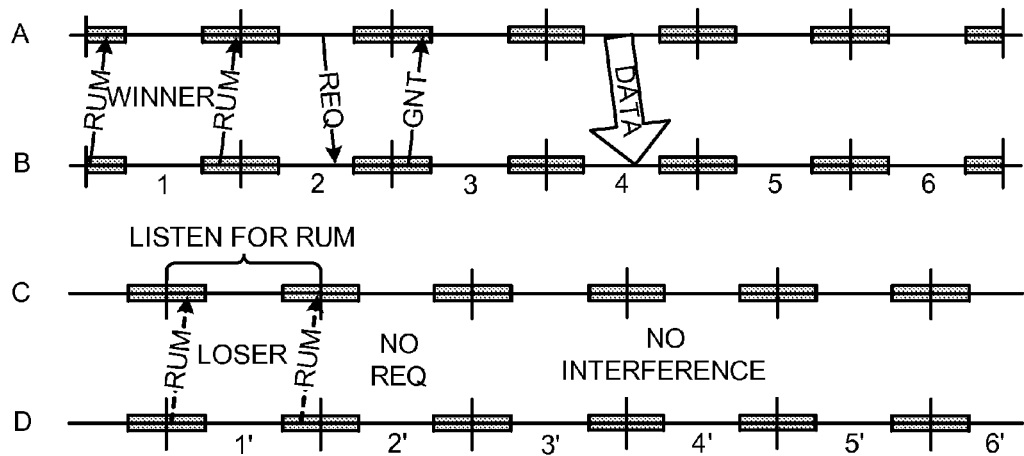
FIG. 6 is a simplified timing diagram of several sample aspects of asynchronous slotted communication.
Figure 7:
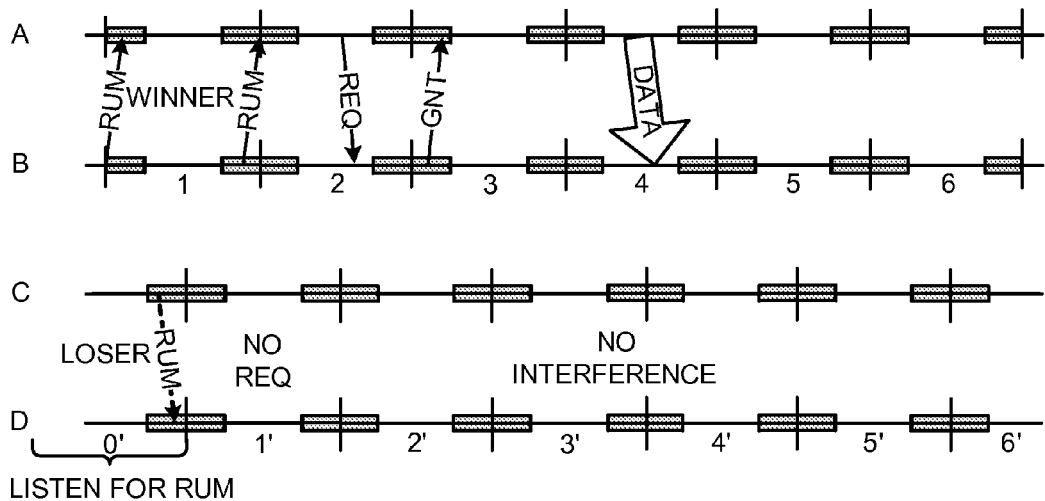
FIG. 7 is a simplified timing diagram of several sample aspects of asynchronous slotted communication.

In FIGS. 6 and 7 the timeslots (e.g., timeslot 1') for nodes C and D are offset in time from the timeslots (e.g., timeslot 1) for nodes A and B. Consequently, any control indications (e.g., RUMs) transmitted by node B at the beginning of timeslot 1, will not be received by node C since its receive timeslot, timeslot 1', starts at a later point in time. Consequently, in accordance with the teachings herein, the nodes may be configured to transmit several control indications during a given transmit timeslot. For example, the nodes may transmit one instance of a RUM during the control channel 402 (FIG. 4) at the beginning of the timeslot and transmit another instance of the RUM during the control channel 408 at the end of the timeslot.

As mentioned above, the nodes also may be configured to scan for RUM for the entirety of their receive timeslots. Here, since the receive timeslot of node A is time aligned with the transmit timeslot of node B, node A will receive both instances of the RUM from node B. In contrast, node C listens for RUMs during timeslot 1'. Accordingly, node C will not be receiving when node B transmits the first instance of the RUM. Node C will, however, receive the second instance of the RUM. In a similar manner, node C will receive both instances of the RUM transmitted by node D and node A will receive the first instance of the RUM transmitted by node D but not the second instance.

Assuming again that node B is more disadvantaged than node D, node A will send its request in timeslot 2 and node C may abstain from sending its request in timeslot 2'. In this case, there will not be interfering transmissions from node C during the beginning portion of timeslot 4' that overlaps with timeslot 4.

FIG. 7 illustrates a similar example for transmission from node D to node C. In this case, node D will receive both instances of the RUMs from node C and the first instance of the RUM from node B (during timeslot 0'). Consequently, node D may abstain from sending its request in timeslot 1'. In this case, there will not be interfering transmissions from node D during the latter portion of timeslot 3' that overlaps with timeslot 4.

Figure 8:
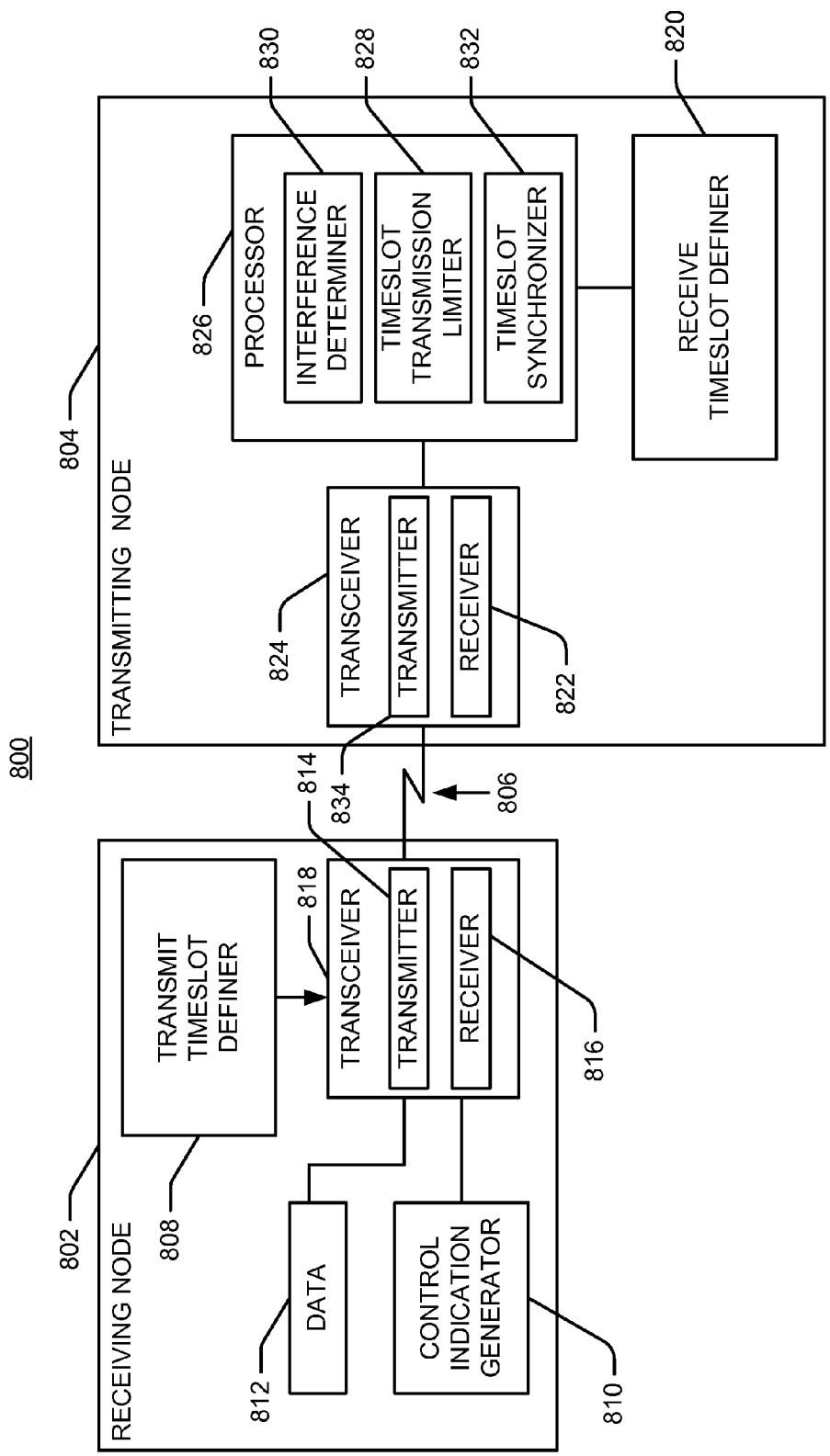
FIG. 8 is a simplified block diagram of several sample aspects of a slotted communication system.
Figure 9:
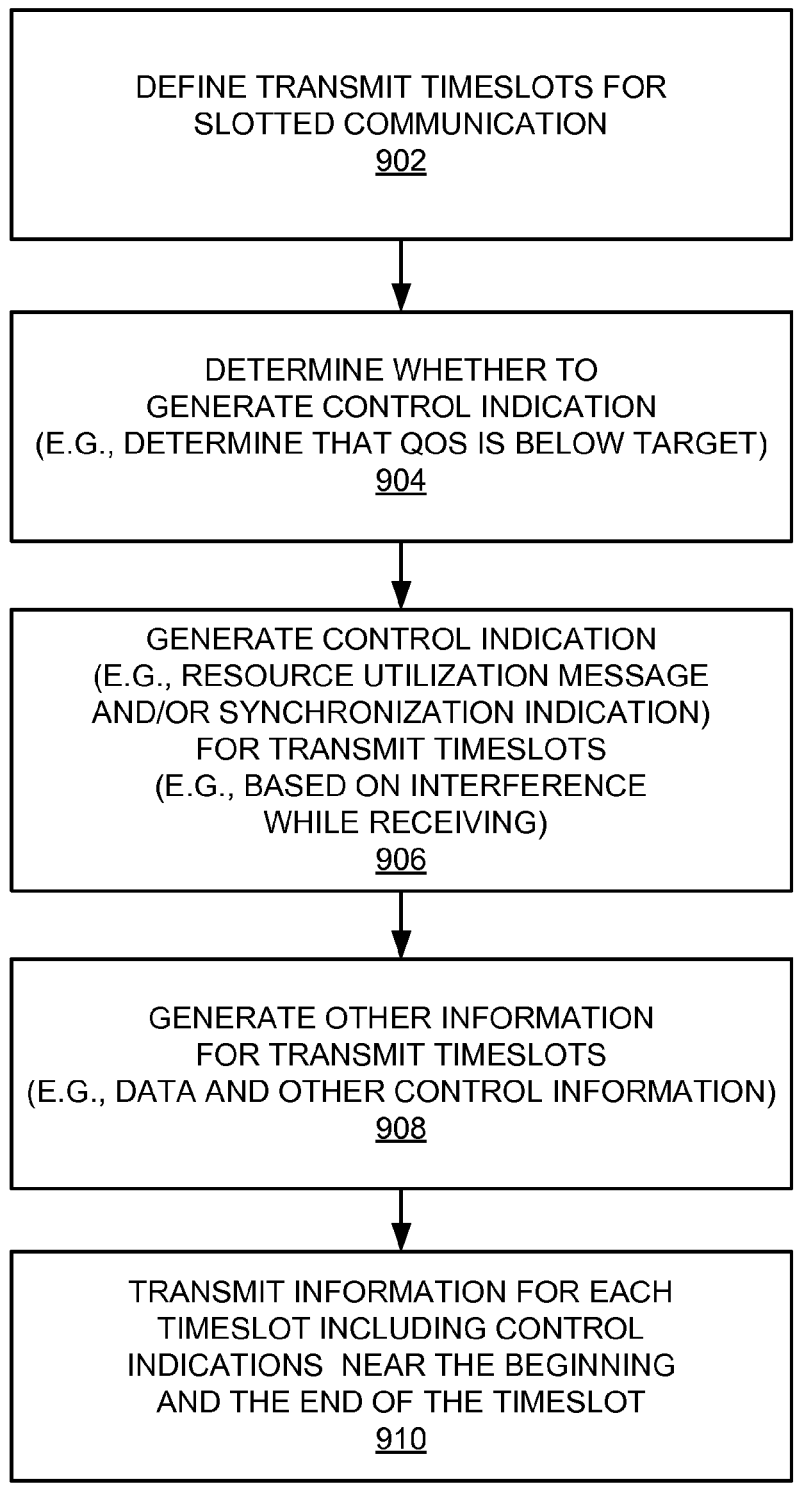
FIG. 9 is a flowchart of several sample aspects of operations that may be performed to transmit information in a slotted communication system.
Figure 10:
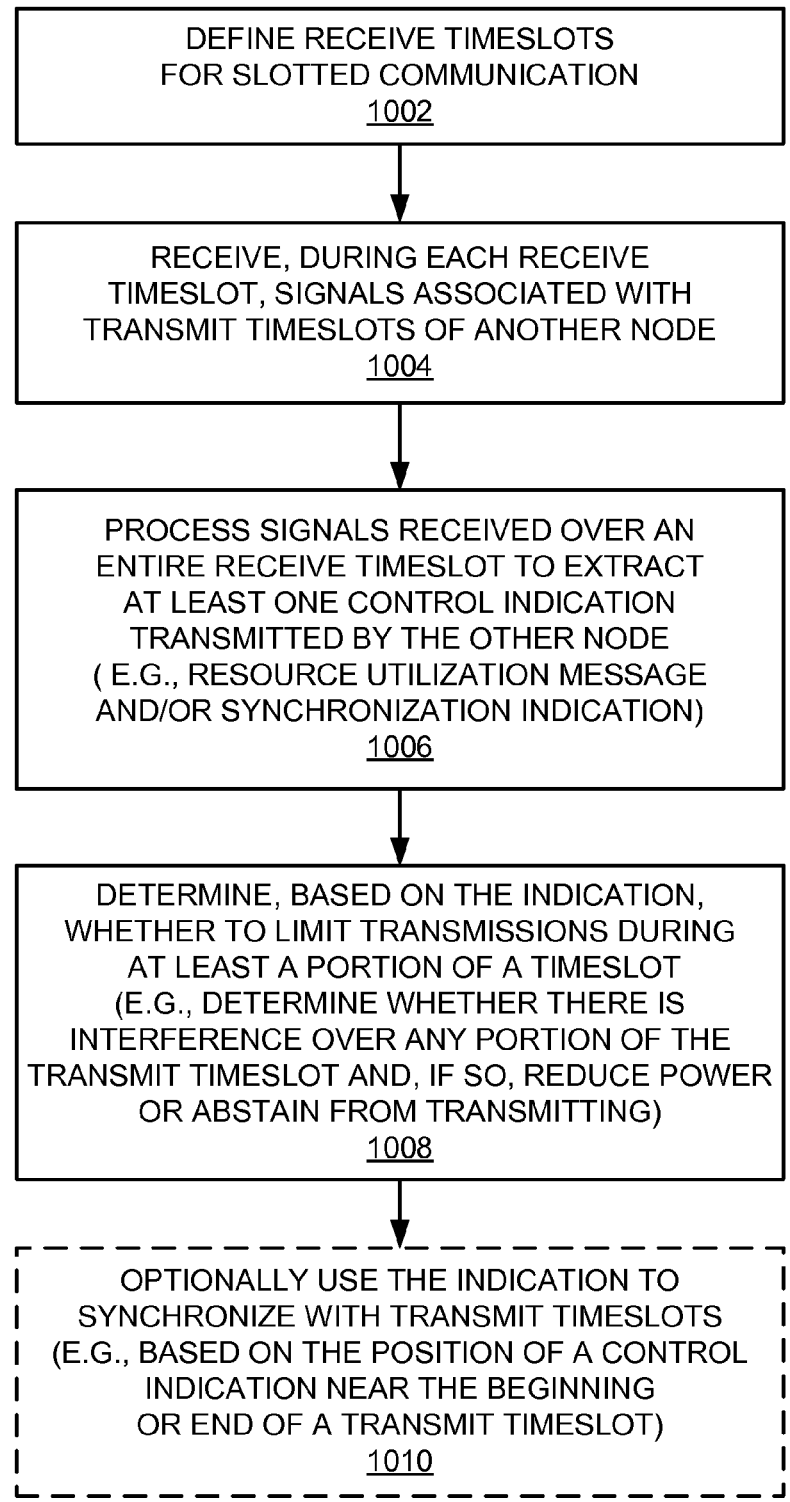
FIG. 10 is a flowchart of several sample aspects of operations that may be performed to receive information in a slotted communication system.

With the above overview in mind, additional details of sample structure and operations of wireless nodes will now be discussed in conjunction with FIGS. 8-10. FIG. 8 depicts a communication system 800 including several operational components 802 and 804 that may be respectively employed to transmit and receive via a wireless communication link 806. FIG. 9 depicts several operations that may be performed in conjunction with transmit operations. FIG. 10 depicts several operations that may be performed in conjunction with receive operations. For convenience, the operations of FIGS. 9 and 10 (or any other operations discussed or taught herein) may be described as being performed by specific components such as those described in system 800. It should be appreciated, however, that these operations may be performed by other types of components and may be performed using a different number of components. It also should be appreciated that one or more of the operations described herein may not be employed in a given implementation.

The operations of FIGS. 9 and 10 relate to the generation and transmission of a control indication by a receiving node (e.g., node B, timeslot 1 in FIG. 6) and the reception of the control indication by a transmitting node (e.g., node C, timeslot 1' in FIG. 6). Here, the designations transmitting node and receiving node are based on the data transfer operations of timeslot 4. Based on the received control indication and possibly other control indications, the transmitting node determines whether to limit one or more subsequent transmissions or, optionally, synchronizes with the timeslots of the receiving node.

Referring to FIG. 9, as represented by block 902, at some point prior to commencement of traffic flow in the system 800, transmit timeslots are defined for the receiving node 802. This may involve, for example, selecting which timeslots a given node will use for transmitting. In addition, in a synchronous system the timeslots of the node 802 may be synchronized with the timeslots of one or more non-associated nodes (e.g., other nodes that are associated with the same access point as node 802). In some implementations the definition of the transmit timeslots may be built into the hardware and/or the code for the node 802. For example, the node 802 may determine which mode it is operating in and then set the timing for the timeslots based on the mode. Here, the timeslot definition may be a function of an operating communication frequency. Accordingly, defining a timeslot may comprise various operations including, but not limited to, establishing predetermined timeslots, preprogramming timeslot-related functionality, performing operations on-line or off-line, providing static or dynamic timeslots, and the operation of hardware, code or both. These and other related operations may be performed by a transmit timeslot definer component 808. In some implementations these operations may involve communicating via a transmitter 814 and a receiver 816 of a transceiver 818 with another node. For example, the node 802 may cooperate with an access point that manages a wireless network to define the timeslots.

At block 904 a control indication generator 810 determines whether to generate a control indication. As discussed herein, the control indication may comprise a RUM, a synchronization indication, or both.

In some aspects the operations of block 904 may involve determining whether one or more traffic flows being received at the node 802 are meeting a quality of service ("QoS") target. Here, quality of service may relate to, for example, throughput, latency, spectral efficiency, data rate, interference, or some other suitable parameter.

For example, in an ad hoc deployment of wireless nodes, a carrier-to-interference ratio ("C/I") may be undesirably low at some nodes. It will be appreciated that interference levels employed to calculate C/I may comprise noise, such that C/I may similarly be expressed as C/(I+N), where N is noise.

A receiving node may manage such interference by requesting that certain transmitting nodes in the vicinity either reduce their respective transmission powers or back off completely from the indicated channels. Accordingly, at block 906 the control indication generator 810 may generate an appropriate control indication based on a determination at block 904 that a quality of service level is not being met. In some aspects a determination of whether a desired quality of service level is met may be a function of, for instance, a ratio of a target quality of service value to an actual quality of service value for a given node. For the above C/I example, the indication may identify all of the channels (e.g., in a multi-channel system) that exhibit a C/I that is below a defined threshold.

To ensure that interference avoidance happens in a fair manner, that is, to ensure that all nodes get a fair share of transmission opportunities, a RUM may comprise node weight information. In some aspects, the weight represents the degree of disadvantage that the node is experiencing and is used in managing the fairness of the channel access between a set of interfering nodes contending for a common resource. The level of disadvantage may be determined as a function of a level of received service at the node, which may be impacted by various parameters such as latency, IOT, C/I, throughput, data rate, spectral efficiency, and so on.

A RUM may thus be broadcast by a node when interference levels on the node's desired receive channels exceed defined threshold level. As an example, if throughput is used to measure the degree of disadvantage, then one possible relationship may be represented as:

$$\text{RUM Weight} = Q\left(\frac{R_{target}}{R_{actual}}\right) \qquad \text{EQUATION 1}$$

where Rtarget represents the desired throughput, $R_{actual}$ is the actual throughput being achieved, and Q(x) represents the quantized value of x. When there is a single flow at the receiving node, Rtarget may represent the minimum desired throughput for that flow and $R_{actual}$ may represent the average throughput that has been achieved for that flow.

A RUM also may comprise a channel bit mask that indicates the channels to which the RUM applies. In some implementations the channel bit mask may be used to provide an additional dimension to realize collision avoidance, which may be useful when a receiving node needs to schedule a small amount of data over a portion of a channel (e.g., when a timeslot defines multiple data channels) and does not want a transmitting node to completely back off from the entire channel. This aspect may provide finer granularity in the collision avoidance mechanism, which may be important for bursty traffic.

In some implementations the number of channels designated by the RUM may be selected based on the level of disadvantage. For example, for a greater disadvantage, a greater number of channels may be selected.

In general, a weight may be defined in a variety of ways and may be based on various criteria. In some aspects a weight may be based on dynamic criteria. For example, as mentioned above a weight may reflect the current conditions of one or more traffic flows associated with a node. In some implementations a weight may correspond to the flow being carried (e.g., received) at that node that is most disadvantaged. In some implementations a weight may be based on more than one flow.

In some aspects a weight may be based on static criteria. For example, a given node may be assigned a weight that is added to other weight parameters. In this way additional priority may be provided for selected nodes.

The quality of service and corresponding disadvantage may be repeatedly reassessed over time to determine whether the node's quality of service has improved. Based on the measured quality of service, the weight and the number of channels for which a subsequent RUM is transmitted may thus be adjusted. For instance, if the node's quality of service did not improve or has worsened, to improve the level of service received at the node the weight may be increased or the number of channels for which a subsequent RUM is transmitted may be increased. If the node's quality of service has improved, then the weight may be decreased and the number of channels for which a subsequent RUM is transmitted may be reduced to conserve resources.

As represented by block 908, the node 802 generates or otherwise obtains any other information that is to be transmitted during a timeslot. For example, the node may provide data 812 to be transmitted by generating the data or retrieving data from a memory device. In addition, the node may generate or otherwise provide control information (e.g., data acknowledgements) to be transmitted during a timeslot.

As represented by block 910, the transmitter 814 transmits the data and control information at the appropriate times during the transmit timeslot. As discussed above, this may include transmitting first and second instances of a control indication near a beginning and an end of the timeslot, respectively. For example, the transmitter 814 may encode the control indication generated at block 906 and transmit the encoded indication at the beginning of a designated transmit timeslot. The transmitter 814 may then encode the data and other information provided at block 908 and transmit this encoded data and information following the first instance of the control indication. Next, the transmitter 814 may again encode the control indication generated at block 906 and transmit this encoded indication at the end of the designated transmit timeslot. Thus, in this example the node transmits multiple instances of a control indication where each instance of the control indication is independently encoded and transmitted. In some implementations the encoded indications may be identical or substantially identical. In some implementations the encoded indications may be different (e.g., due to the inclusion of different synchronization information). It should be appreciated that the above techniques also may be used to transmit more than two instances of a control indication, if desired. In addition, depending on the timeslot control structure control indications may not be transmitted in every transmit timeslot.

In some aspects all of the RUMs in a system (e.g., a given network) may be transmitted at a constant power spectral density ("PSD") or at a constant power. This may be the case regardless of the normal transmit power of the node. In this way, RUMs may be received at potentially interfering (e.g., higher power) transmitting nodes that are relatively far away, irrespective of whether the RUM-sending node is a lower power node or a higher power node. In other words, the RUM decoding range may be designed to be substantially equal to or greater than the largest transmit interference range to be controlled by the system.

Referring now to FIG. 10, as represented by block 1002, receive timeslots are defined for the node 804. This may involve, for example, operations that are similar to the operations of block 902. To this end the node 804 may include a receive timeslot definer component 820. The timeslot definer 820 synchronizes the receive timeslots of node 804 with the transmit timeslots of any associated nodes (e.g., node 802). In addition, in a synchronous system the node 804 may be configured to synchronize its receive timeslots with transmit timeslots of a non-associated node (e.g., as discussed below at block 1010).

As represented by block 1004, a receiver component 822 of a transceiver 824 may receive, during a given receive timeslot, signals associated with a transmit timeslot of the node 802. For example, in an asynchronous configuration the receive timeslot of node 804 may overlap only a portion of the transmit timeslot of node 802 (e.g., as shown in FIG. 6).

As represented by block 1006, a processor 826 may be configured to process the signals received over the entire receive timeslot to extract at least one instance of a control indication that was transmitted during a transmit timeslot. Referring again to the example of FIG. 6, the node C may receive the second instance of the RUM transmitted by node B during a given timeslot. As mentioned above, the control indication may comprise a RUM, a synchronization indication, or both.

As represented by block 1008, a timeslot transmission limiter 828 may determine, based on one or more received control indications whether to limit a future transmission by a transmitter 834 of the node 804. For example, the timeslot transmission limiter 828 may cause the node 804 to abstain from transmitting or reduce its transmit power. In the former case, the node 804 may not send a request to transmit (e.g., see node C in FIG. 6). In the latter case, the node 804 may determine whether there is an acceptable level of transmit power that will not cause interference at a RUM-sending node (e.g., node 802).

In conjunction with the above, an interference determiner 830 may determine whether there is a possibility that the node 804 will interfere with receive operations of a RUM-sending node. As mentioned previously, a RUM may be sent at a constant power spectral density ("PSD") or at a constant power. A RUM-receiving node (e.g., node 804) may thus estimate a radio frequency ("RF") channel gain between itself and the RUM-sending node based on the received power spectral density and/or the received power of the RUM and based on knowledge of the power spectral density and/or the power at which the RUM was transmitted. In this way, the RUM-receiving node may determine whether it will cause interference at the RUM-sending node if it transmits. Such a determination may involve, for example, determining whether the estimated level of interference is above a defined acceptable threshold level.

There may thus be situations wherein a RUM-receiving node is able to decode the RUM from the RUM-sending node, but determines that it will not cause interference. For example, a low power node may not limit future transmissions since its transmissions may not be strong enough to cause interference at the RUM-sending node.

In some aspects determining whether to limit a future transmission by the node 804 involves prioritizing the relative disadvantage of each RUM-sending node. For example, if several nodes are disadvantaged, each of these nodes may send a RUM. In this case, a node that receives these RUMs may use some criterion or criteria to determine whether any of the nodes has a higher priority (e.g., a greater disadvantage) than one or more other nodes.

In some aspects this determination involves comparing weights associated with each of the RUMs. In one example, the RUM-sending node associated with the highest weight may be designated as node with highest priority (e.g., the winning node in FIGS. 6 and 7).

Next, the RUM-receiving node determines whether a node with priority is an associated node. Here, the RUM-receiving node will not limit its transmission if the node it transmits to (e.g., its associated node) is the winning node. Conversely, if some other node is the winning node, the RUM-receiving node may limit its transmissions as discussed herein.

In some aspects the timeslot transmission limiter 828 may identify a portion of a transmit timeslot of the node 804 for which transmission will be limited (e.g., corresponding to a portion of a receive timeslot of another node that is subject to interference). For example, referring to FIG. 6 only the first half of the timeslot 4' overlaps with timeslot 4. Accordingly, the timeslot transmission limiter 828 may elect to only limit transmissions during this portion of timeslot 4' to reduce the potential interference with receptions during timeslot 4. In some aspects this may involve determining the timing of the transmit timeslot relative to the receive timeslot. This timing information may be obtained, for example, based on at least one of the instances of the control indication. For example, as is described in more detail in conjunction with block 1010, one or more instances of a control indication may include information indicative of its location relative to the beginning and/or the end of the transmit timeslot.

As represented by block 1010, in some implementations a node may optionally synchronize its timeslots with the timeslots of another node. For example, a node may elect to synchronize with another node in an attempt to achieve an improvement in communication performance (e.g., higher channel capacity and improved quality of service). To accomplish synchronization, the node 804 may include a timeslot synchronizer 832 that is configured to determine the timing of timeslots of another node and adjust the timeslots of the node 804 accordingly.

In some aspects synchronization may be achieved through the use of received control indications. For example, a control indication may include information indicative of the location of the control indication within a timeslot. The node 804 may then use this information to synchronize to the timeslot. For example, if a control indication is located at the beginning or the end of the timeslot, the control indication may comprise a synchronization indication of this relationship. The node 804 may then readily synchronize to the timeslot since the node 804 can then determine the times of the beginning or the end of the timeslot based on the timing of the control indication.

Figure 11:
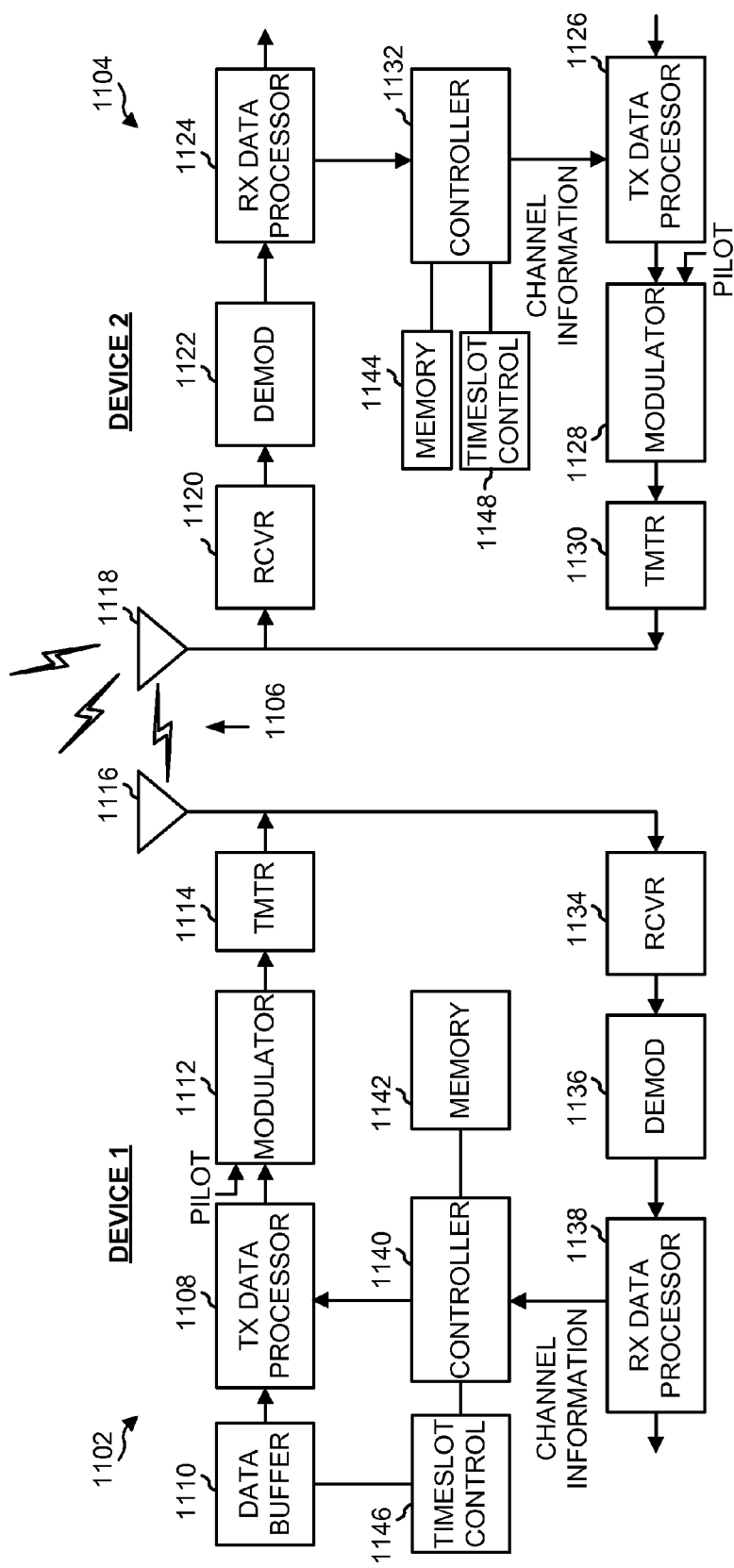
FIG. 11 is a simplified block diagram of several sample aspects of communication components.

The teachings herein may be incorporated into a device employing various components for communicating with at least one other wireless device. FIG. 11 depicts several sample components that may be employed to facilitate communication between devices. Here, a first device 1102 (e.g., an access terminal) and a second device 1104 (e.g., an access point) are adapted to communicate via a wireless communication link 1106 over a suitable medium.

Initially, components involved in sending information from the device 1102 to the device 1104 (e.g., a reverse link) will be treated. A transmit ("TX") data processor 1108 receives traffic data (e.g., data packets) from a data buffer 1110 or some other suitable component. The transmit data processor 1108 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 1112 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 1114 processes (e.g., converts to analog, filters, amplifies, and frequency upconverts) the output chip stream and generates a modulated signal, which is then transmitted from an antenna 1116.

The modulated signals transmitted by the device 1102 (along with signals from other devices in communication with the device 1104) are received by an antenna 1118 of the device 1104. A receiver ("RCVR") 1120 processes (e.g., conditions and digitizes) the received signal from the antenna 1118 and provides received samples. A demodulator ("DEMOD") 1122 processes (e.g., demodulates and detects) the received samples and provides detected data symbols, which may be a noisy estimate of the data symbols transmitted to the device 1104 by the other device(s). A receive ("RX") data processor 1124 processes (e.g., symbol demaps, deinterleaves, and decodes) the detected data symbols and provides decoded data associated with each transmitting device (e.g., device 1102).

Components involved in sending information from the device 1104 to the device 1102 (e.g., a forward link) will be now be treated. At the device 1104, traffic data is processed by a transmit ("TX") data processor 1126 to generate data symbols. A modulator 1128 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 1130 and transmitted from the antenna 1118. In some implementations signaling for the forward link may include power control commands and other information (e.g., relating to a communication channel) generated by a controller 1132 for all devices (e.g. terminals) transmitting on the reverse link to the device 1104.

At the device 1102, the modulated signal transmitted by the device 1104 is received by the antenna 1116, conditioned and digitized by a receiver ("RCVR") 1134, and processed by a demodulator ("DEMOD") 1136 to obtain detected data symbols. A receive ("RX") data processor 1138 processes the detected data symbols and provides decoded data for the device 1102 and the forward link signaling. A controller 1140 receives power control commands and other information to control data transmission and to control transmit power on the reverse link to the device 1104.

The controllers 1140 and 1132 direct various operations of the device 1102 and the device 1104, respectively. For example, a controller may determine an appropriate filter, reporting information about the filter, and decode information using a filter. Data memories 1142 and 1144 may store program codes and data used by the controllers 1140 and 1132, respectively.

FIG. 11 also illustrates that the communication components may include one or more components that perform timeslot-related operations as taught herein. For example, a timeslot control component 1146 may cooperate with the controller 1140 and/or other components of the device 1102 to send and receive signals to another device (e.g., device 1104) in accordance with defined timeslots as taught herein. Similarly, a timeslot control component 1148 may cooperate with the controller 1132 and/or other components of the device 1104 to send and receive signals to another device (e.g., device 1102) in accordance with defined timeslots.

The teachings herein may be incorporated into (e.g., implemented within or performed by) a variety of apparatuses (e.g., devices). For example, each node may be configured, or referred to in the art, as an access point ("AP"), NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. Certain nodes also may be referred to as subscriber stations. A subscriber station also may be known as a subscriber unit, a mobile station, a remote station, a remote terminal, an access terminal, a user terminal, a user agent, a user device, or user equipment. In some implementations a subscriber station may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

As mentioned above, in some aspects a wireless node may comprise an access device (e.g., a cellular or Wi-Fi access point) for a communication system. Such an access device may provide, for example, connectivity for or to a network (e.g., a wide area network such as the Internet or a cellular network) via a wired or wireless communication link. Accordingly, the access device may enable another device (e.g., a Wi-Fi station) to access the network or some other functionality.

A wireless node may thus include various components that perform functions based on data transmitted by or received at the wireless node. For example, an access point and an access terminal may include an antenna for transmitting and receiving signals (e.g., control and data). An access point also may include a traffic manager configured to manage data traffic flows that its receiver receives from a plurality of wireless nodes or that its transmitter transmits to a plurality of wireless nodes. In addition, an access terminal may include a user interface configured to output data received by the receiver or provide data to be transmitted by the transmitter.

A wireless device may communicate via one or more wireless communication links that are based on or otherwise support any suitable wireless communication technology. For example, in some aspects a wireless device may associate with a network or two or more wireless devices may form a network. In some aspects the network may comprise a local area network or a wide area network. A wireless device may support or otherwise use one or more of a variety of wireless communication protocols or standards including, for example, CDMA, TDMA, OFDM, OFDMA, WiMAX, Wi-Fi, or other wireless technologies. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a wireless device may comprise a wireless transceiver with associated transmitter and receiver components (e.g., transmitters 814 and 834 and receivers 816 and 822) that may include various components (e.g., signal generators and signal processors) that facilitate communication over a wireless medium.

Figure 12:
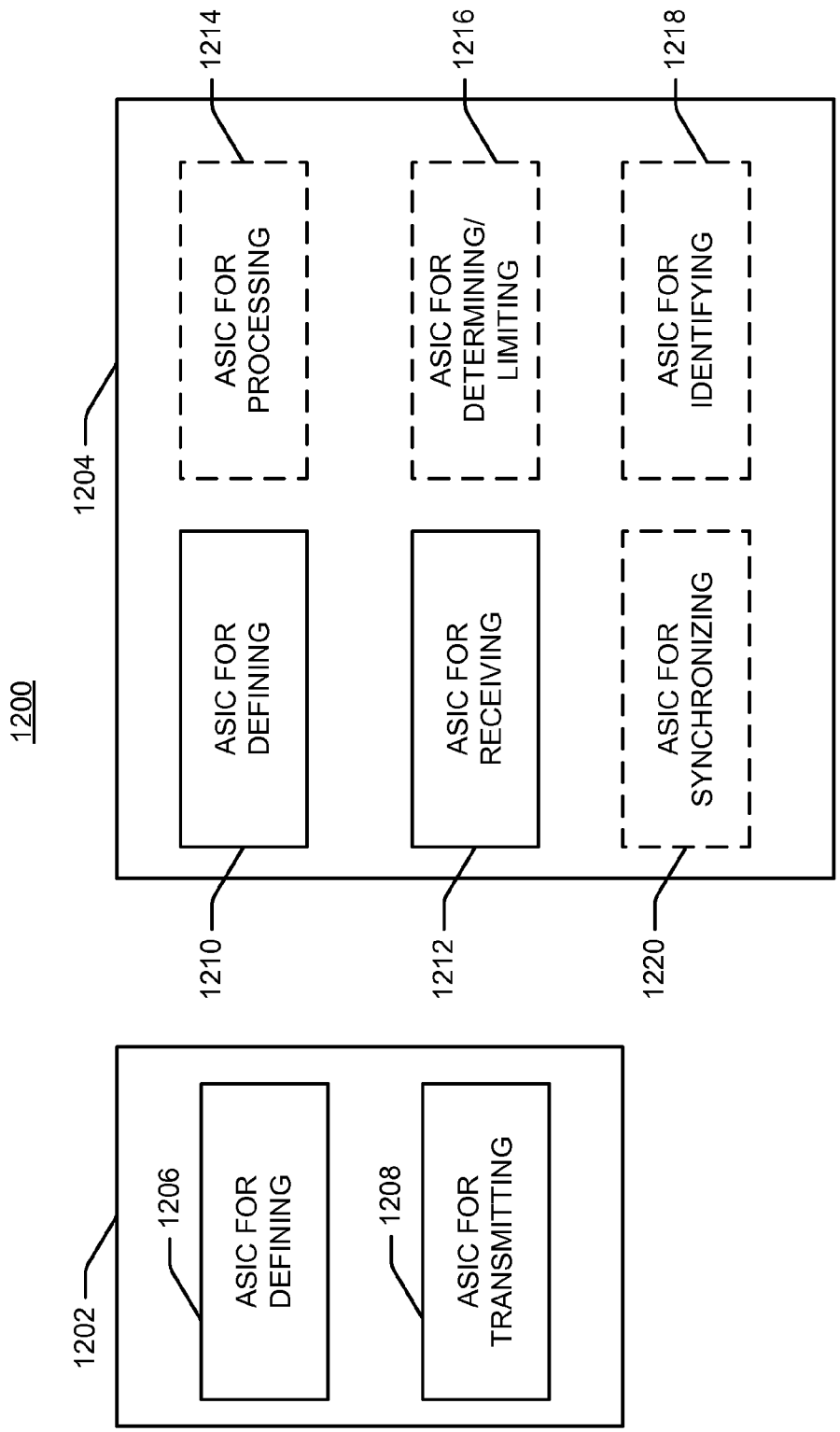
FIG. 12 depicts simplified block diagrams of several sample aspects of apparatuses adapted to provide slotted communication.

The components described herein may be implemented in a variety of ways. Referring to FIG. 12, a system 1200 including apparatus 1202 and apparatus 1204 is represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof.

As shown in FIG. 12, the apparatuses 1202 and 1204 may include one or more modules 1206, 1208, 1210, 1212, 1214, 1216, 1218, and 1220 that may perform one or more of the functions described above with regard to various figures. For example, an ASIC for defining 1206 may provide functionality relating to defining timeslots and may correspond to, for example, component 808 discussed above. An ASIC for transmitting 1208 may provide functionality relating to transmitting signals and may correspond to, for example, component 814 discussed above. An ASIC for defining 1210 may provide functionality relating to defining timeslots and may correspond to, for example, component 820 discussed above. An ASIC for receiving 1212 may provide functionality relating to receiving signals as taught herein and may correspond to, for example, component 822 discussed above. An ASIC for processing 1214 may provide functionality relating to processing information as taught herein and may correspond to, for example, component 826 discussed above. An ASIC for determining/limiting 1216 may provide functionality relating to limiting transmission as taught herein and may correspond to, for example, component 828 discussed above. An ASIC for identifying 1218 may provide functionality relating to identifying interference as taught herein and may correspond to, for example, component 830 discussed above. An ASIC for synchronizing 1220 may provide functionality relating to synchronizing timeslots as taught herein and may correspond to, for example, component 832 discussed above.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

As noted above, the apparatus 1200 may comprise one or more integrated circuits that provide the functionality of the components illustrated in FIG. 12. For example, in some aspects a single integrated circuit may implement the functionality of the illustrated components, while in other aspects more than one integrated circuit may implement the functionality of the illustrated components.

In addition, the components and functions represented by FIG. 12, as well as other components and functions described herein, may be implemented using any suitable means. Such means also may be implemented, at least in part, using corresponding structure as taught herein. For example, in some aspects means for transmitting may comprise a transmitter, means for receiving may comprise a receiver, means for defining may comprise a timeslot definer, means for processing may comprise a processor, means for determining may comprise a timeslot transmission limiter, means for limiting may comprise a timeslot transmission limiter, means for identifying may comprise an interference determiner, and means for synchronizing may comprise a timeslot synchronizer. One or more of such means also may be implemented in accordance with one or more of the processor components of FIG. 12.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method for wireless communication, comprising:
defining a timeslot for slotted communication; and
transmitting, in the timeslot, data and at least two instances of a control indication, wherein:
each instance of the control indication is independently encoded and transmitted,
each instance of the control indication comprises an interference management indication and information that specifies a position within the timeslot at which the instance of the control indication is located,
the interference management indication indicates a degree of disadvantage that is based on a measured quality of service associated with at least one traffic flow established at an apparatus, and
the instances of the control indication are separated by at least a portion of the data.

2. The method of claim 1, wherein:
a first one of the instances of the control indication is transmitted near a beginning of the timeslot;
a second one of the instances of the control indication is transmitted near an end of the timeslot;
the information of the first one of the instances specifies that that the first one of the instances is located near the beginning of the timeslot; and
the information of the second one of the instances specifies that that the second one of the instances is located near the end of the timeslot.

3. The method of claim 2, wherein:
near a beginning of the timeslot comprises the beginning of the timeslot; and
near an end of the timeslot comprises the end of the timeslot.

4. The method of claim 1, wherein:
the interference management indication comprises a resource utilization message; and
the resource utilization message indicates a degree to which data reception at the apparatus is being adversely affected by interfering transmissions from at least one wireless node.

5. The method of claim 4, wherein the resource utilization message identifies a channel and requests that at least one wireless node refrain from transmitting on the identified channel or reduce transmission power on the identified channel.

6. The method of claim 1, wherein at least one of the instances of the control indication comprises information that facilitates synchronization with the timeslot.

7. The method of claim 1, wherein the position is near a beginning or an end of the timeslot.

8. The method of claim 1, wherein the slotted communication comprises time division duplex communication or frequency division duplex communication.

9. The method of claim 1, wherein the control indication includes a weight indicating a degree to which the apparatus is disadvantaged.

10. The method of claim 9, wherein the weight is based on a ratio of an actual throughput achieved at the apparatus and a desired throughput for the apparatus.

11. The method of claim 9, wherein the weight indicates an extent to which reception of data at the apparatus is falling below a desired level.

12. A method for wireless communication, comprising:
measuring quality of service associated with one or more traffic flows established at an apparatus;
determining whether the measured quality of service associated with the one or more traffic flows meets a quality of service target;
generating an interference management indication if the quality of service target is not being met, wherein the interference management indication indicates a degree of disadvantage that is based on the measured quality of service;
defining a timeslot for slotted communication; and
transmitting, in the timeslot, data and at least two instances of a control indication, wherein:
each instance of the control indication is independently encoded and transmitted,
each instance of the control indication comprises information that specifies a position within the timeslot at which the instance of the control indication is located, and
the control indication comprises the interference management indication if the quality of service target is not being met.

13. The method of claim 12, wherein the interference management indication requests that at least one wireless node refrain from transmitting on a channel or reduce transmission power on the channel.

14. The method of claim 13, wherein the interference management indication is repeated in each instance of the control indication.

15. An apparatus for wireless communication, comprising:
a timeslot definer configured to define a timeslot for slotted communication; and
a transmitter configured to transmit, in the timeslot, data and at least two instances of a control indication, wherein:
the transmitter is further configured to independently encode and transmit each instance of the control indication,
each instance of the control indication comprises an interference management indication and information that specifies a position within the timeslot at which the instance of the control indication is located,
the interference management indication indicates a degree of disadvantage that is based on a measured quality of service associated with at least one traffic flow established at the apparatus, and
the instances of the control indication are separated by at least a portion of the data.

16. The apparatus of claim 15, wherein:
the transmitter is further configured to transmit a first one of the instances of the control indication near a beginning of the timeslot and a second one of the instances of the control indication near an end of the timeslot;
the information of the first one of the instances specifies that that the first one of the instances is located near the beginning of the timeslot; and
the information of the second one of the instances specifies that that the second one of the instances is located near the end of the timeslot.

17. The apparatus of claim 16, wherein:
near a beginning of the timeslot comprises the beginning of the timeslot; and
near an end of the timeslot comprises the end of the timeslot.

18. The apparatus of claim 15, wherein:
the interference management indication comprises a resource utilization message; and
the resource utilization message indicates a degree to which data reception at the apparatus is being adversely affected by interfering transmissions from at least one wireless node.

19. The apparatus of claim 15, wherein at least one of the instances of the control indication comprises information that facilitates synchronization with the timeslot.

20. The apparatus of claim 15, wherein the position is near a beginning or an end of the timeslot.

21. The apparatus of claim 15, wherein the slotted communication comprises time division duplex communication or frequency division duplex communication.

22. An apparatus for wireless communication, comprising:
a control indication generator configured to measure quality of service associated with one or more traffic flows established at the apparatus, determine whether the measured quality of service associated with the one or more traffic flows meets a quality of service target, and generate a control indication, wherein the control indication comprises an interference management indication if the quality of service target is not being met, and wherein the interference management indication indicates a degree of disadvantage that is based on the measured quality of service;
a time slot definer configured to define a timeslot for slotted communication; and
a transmitter configured to transmit, in the timeslot, data and at least two instances of the control indication, wherein the transmitter is further configured to independently encode and transmit each instance of the control indication, and wherein each instance of the control indication comprises information that specifies a position within the timeslot at which the instance of the control indication is located.

23. The apparatus of claim 22, wherein the interference management indication requests that at least one wireless node refrain from transmitting on a channel or reduce transmission power on the channel.

24. The apparatus of claim 23, wherein the interference management indication is repeated in each instance of the control indication.

25. An apparatus for wireless communication, comprising:
means for defining a timeslot for slotted communication; and means for transmitting, in the timeslot, data and at least two instances of a control indication, wherein:
    each instance of the control indication is independently encoded and transmitted,
    each instance of the control indication comprises an interference management indication and information that specifies a position within the timeslot at which the instance of the control indication is located,
    the interference management indication indicates a degree of disadvantage that is based on a measured quality of service associated with at least one traffic flow established at the apparatus, and
    the instances of the control indication are separated by at least a portion of the data.

26. The apparatus of claim 25, wherein:
the means for transmitting transmits a first one of the instances of the control indication near a beginning of the timeslot and a second one of the instances of the control indication near an end of the timeslot;
the information of the first one of the instances specifies that that the first one of the instances is located near the beginning of the timeslot; and
the information of the second one of the instances specifies that that the second one of the instances is located near the end of the timeslot.

27. The apparatus of claim 26, wherein:
near a beginning of the timeslot comprises the beginning of the timeslot; and
near an end of the timeslot comprises the end of the timeslot.

28. The apparatus of claim 25, wherein:
the interference management indication comprises a resource utilization message; and
the resource utilization message indicates a degree to which data reception at the apparatus is being adversely affected by interfering transmissions from at least one wireless node.

29. The apparatus of claim 25, wherein at least one of the instances of the control indication comprises information that facilitates synchronization with the timeslot.

30. The apparatus of claim 25, wherein the position is near a beginning or an end of the timeslot.

31. The apparatus of claim 25, wherein the slotted communication comprises time division duplex communication or frequency division duplex communication.

32. An apparatus for wireless communication, comprising:
means for measuring quality of service associated with one or more traffic flows established at the apparatus;
means for determining whether the measured quality of service associated with the one or more traffic flows meets a quality of service target;
means for generating an interference management indication if the quality of service target is not being met, wherein the interference management indication indicates a degree of disadvantage that is based on the measured quality of service;
means for defining a timeslot for slotted communication; and
means for transmitting, in the timeslot, data and at least two instances of a control indication, wherein:
    each instance of the control indication is independently encoded and transmitted,
    each instance of the control indication comprises information that specifies a position within the timeslot at which the instance of the control indication is located, and
    the control indication comprises the interference management indication if the quality of service target is not being met.

33. The apparatus of claim 32, wherein the interference management indication requests that at least one wireless node refrain from transmitting on a channel or reduce transmission power on the channel.

34. The apparatus of claim 33, wherein the interference management indication is repeated in each instance of the control indication.

35. A computer-program product for wireless communication, comprising:
a computer-readable storage device encoded with codes executable by at least one computer to:
define a timeslot for slotted communication; and
transmit, in the timeslot, data and at least two instances of a control indication, wherein:
    each instance of the control indication is independently encoded and transmitted,
    each instance of the control indication comprises an interference management indication and information that specifies a position within the timeslot at which the instance of the control indication is located,
    the interference management indication indicates a degree of disadvantage that is based on a measured quality of service associated with at least one traffic flow established at an apparatus, and
    the instances of the control indication are separated by at least a portion of the data.

36. An access point for wireless communication, comprising:
an antenna;
a timeslot definer configured to define a timeslot for slotted communication; and
a transmitter configured to transmit, in the timeslot, data and at least two instances of a control indication via the antenna, wherein:
    the transmitter is further configured to independently encode and transmit each instance of the control indication,
    each instance of the control indication comprises an interference management indication and information that specifies a position within the timeslot at which the instance of the control indication is located,
    the interference management indication indicates a degree of disadvantage that is based on a measured quality of service associated with at least one traffic flow established at the access point, and
    the instances of the control indication are separated by at least a portion of the data.

37. An access terminal for wireless communication, comprising:
a timeslot definer configured to define a timeslot for slotted communication;
a transmitter configured to transmit, in the timeslot, data and at least two instances of a control indication, wherein:
    the transmitter is further configured to independently encode and transmit each instance of the control indication,
    each instance of the control indication comprises an interference management indication and information that specifies a position within the timeslot at which the instance of the control indication is located,
    the interference management indication indicates a degree of disadvantage that is based on a measured quality of service associated with at least one traffic flow established at the access terminal, and the instances of the control indication are separated by at least a portion of the data; and a user interface configured to provide data to be transmitted by the transmitter.

38. A method for wireless communication, comprising:
defining a receive timeslot for slotted communication; and
receiving, during the receive timeslot, signals associated with a transmit timeslot, wherein:
the transmit timeslot comprises data and at least two instances of a control indication;
each instance of the control indication is independently encoded and transmitted;
each instance of the control indication comprises an interference management indication and information that specifies a position within the timeslot at which the instance of the control indication is located;
the interference management indication indicates a degree of disadvantage that is based on a measured quality of service associated with at least one traffic flow established at an apparatus; and
the instances of the control indication are separated by at least a portion of the data.

39. The method of claim 38, further comprising processing the signals received over an entirety of the receive timeslot to extract at least one of the instances of the control indication for the transmit timeslot.

40. The method of claim 38, wherein:
the instances of the control indication for the transmit timeslot are near a beginning of the transmit timeslot and near an end of the transmit timeslot;
the information of a first one of the instances specifies that that the first one of the instances is located near the beginning of the transmit timeslot; and
the information of a second one of the instances specifies that that the second one of the instances is located near the end of the transmit timeslot.

41. The method of claim 40, wherein:
near a beginning of the transmit timeslot comprises the beginning of the transmit timeslot; and
near an end of the transmit timeslot comprises the end of the transmit timeslot.

42. The method of claim 38, wherein:
the interference management indication comprises a resource utilization message; and
the resource utilization message indicates a degree to which data reception at the apparatus is being adversely affected by interfering transmissions.

43. The method of claim 38, further comprising determining, based on at least one of the instances of the control indication, whether to limit transmissions during at least a portion of a subsequent timeslot.

44. The method of claim 38, further comprising:
identifying, based on at least one of the instances of the control indication, a portion of a subsequent timeslot subject to interference; and
limiting transmissions during the identified portion of the subsequent timeslot.

45. The method of claim 38, wherein at least one of the instances of the control indication comprises information that facilitates synchronization to the transmit timeslot.

46. The method of claim 38, further comprising synchronizing to the transmit timeslot based on at least one of the instances of the control indication.

47. The method of claim 38, further comprising synchronizing to the transmit timeslot based on the information.

48. The method of claim 47, wherein the position is near a beginning or an end of the transmit timeslot.

49. The method of claim 38, wherein the transmit timeslot and the receive timeslot are not synchronized in time.

50. The method of claim 38, wherein the slotted communication comprises time division duplex communication or frequency division duplex communication.

51. An apparatus for wireless communication, comprising:
a timeslot definer configured to define a receive timeslot for slotted communication; and
a receiver configured to receive, during the receive timeslot, signals associated with a transmit timeslot, wherein:
the transmit timeslot comprises data and at least two instances of a control indication;
each instance of the control indication is independently encoded and transmitted;
each instance of the control indication comprises an interference management indication and information that specifies a position within the timeslot at which the instance of the control indication is located;
the interference management indication indicates a degree of disadvantage that is based on a measured quality of service associated with at least one traffic flow established at another apparatus; and
the instances of the control indication are separated by at least a portion of the data.

52. The apparatus of claim 51, further comprising a processor configured to process the signals received over an entirety of the receive timeslot to extract at least one of the instances of the control indication for the transmit timeslot.

53. The apparatus of claim 51, wherein:
the instances of the control indication for the transmit timeslot are near a beginning of the transmit timeslot and near an end of the transmit timeslot;
the information of a first one of the instances specifies that that the first one of the instances is located near the beginning of the transmit timeslot; and
the information of a second one of the instances specifies that that the second one of the instances is located near the end of the transmit timeslot.

54. The apparatus of claim 53, wherein:
near a beginning of the transmit timeslot comprises the beginning of the transmit timeslot; and
near an end of the transmit timeslot comprises the end of the transmit timeslot.

55. The apparatus of claim 51, wherein:
the interference management indication comprises a resource utilization message; and
the resource utilization message indicates a degree to which data reception at the other apparatus is being adversely affected by interfering transmissions.

56. The apparatus of claim 51, further comprising a transmission limiter configured to determine, based on at least one of the instances of the control indication, whether to limit transmissions during at least a portion of a subsequent timeslot.

57. The apparatus of claim 51, further comprising:
an interference determiner configured to identify, based on at least one of the instances of the control indication, a portion of a subsequent timeslot subject to interference; and
a transmission limiter configured to limit transmissions during the identified portion of the subsequent timeslot.

58. The apparatus of claim 51, wherein at least one of the instances of the control indication comprises information that facilitates synchronization to the transmit timeslot.

59. The apparatus of claim 51, further comprising a timeslot synchronizer configured to synchronize to the transmit timeslot based on at least one of the instances of the control indication.

60. The apparatus of claim 51, further comprising a timeslot synchronizer configured to synchronize to the transmit timeslot based on the information.

61. The apparatus of claim 60, wherein the position is near a beginning or an end of the transmit timeslot.

62. The apparatus of claim 51, wherein the transmit timeslot and the receive timeslot are not synchronized in time.

63. The apparatus of claim 51, wherein the slotted communication comprises time division duplex communication or frequency division duplex communication.

64. An apparatus for wireless communication, comprising:
means for defining a receive timeslot for slotted communication; and
means for receiving, during the receive timeslot, signals associated with a transmit timeslot, wherein:
the transmit timeslot comprises data and at least two instances of a control indication;
each instance of the control indication is independently encoded and transmitted;
each instance of the control indication comprises an interference management indication and information that specifies a position within the timeslot at which the instance of the control indication is located;
the interference management indication indicates a degree of disadvantage that is based on a measured quality of service associated with at least one traffic flow established at another apparatus; and
the instances of the control indication are separated by at least a portion of the data.

65. The apparatus of claim 64, further comprising means for processing the signals received over an entirety of the receive timeslot to extract at least one of the instances of the control indication for the transmit timeslot.

66. The apparatus of claim 64, wherein:
the instances of the control indication for the transmit timeslot are near a beginning of the transmit timeslot and near an end of the transmit timeslot;
the information of a first one of the instances specifies that that the first one of the instances is located near the beginning of the transmit timeslot; and
the information of a second one of the instances specifies that that the second one of the instances is located near the end of the transmit timeslot.

67. The apparatus of claim 66, wherein:
near a beginning of the transmit timeslot comprises the beginning of the transmit timeslot; and
near an end of the transmit timeslot comprises the end of the transmit timeslot.

68. The apparatus of claim 64, wherein:
the interference management indication comprises a resource utilization message; and
the resource utilization message indicates a degree to which data reception at the other apparatus is being adversely affected by interfering transmissions.

69. The apparatus of claim 64, further comprising means for determining, based on at least one of the instances of the control indication, whether to limit transmissions during at least a portion of a subsequent timeslot.

70. The apparatus of claim 64, further comprising:
means for identifying, based on at least one of the instances of the control indication, a portion of a subsequent timeslot subject to interference; and
means for limiting transmissions during the identified portion of the subsequent timeslot.

71. The apparatus of claim 64, wherein at least one of the instances of the control indication comprises information that facilitates synchronization to the transmit timeslot.

72. The apparatus of claim 64, further comprising means for synchronizing to the transmit timeslot based on at least one of the instances of the control indication.

73. The apparatus of claim 64, further comprising means for synchronizing to the transmit timeslot based on the information.

74. The apparatus of claim 73, wherein the position is near a beginning or an end of the transmit timeslot.

75. The apparatus of claim 64, wherein the transmit timeslot and the receive timeslot are not synchronized in time.

76. The apparatus of claim 64, wherein the slotted communication comprises time division duplex communication or frequency division duplex communication.

77. A computer-program product for wireless communication, comprising:
a computer-readable storage device encoded with codes executable by at least one computer to:
define a receive timeslot for slotted communication; and
receive, during the receive timeslot, signals associated with a transmit timeslot, wherein:
the transmit timeslot comprises data and at least two instances of a control indication;
each instance of the control indication is independently encoded and transmitted;
each instance of the control indication comprises an interference management indication and information that specifies a position within the timeslot at which the instance of the control indication is located;
the interference management indication indicates a degree of disadvantage that is based on a measured quality of service associated with at least one traffic flow established at an apparatus; and
the instances of the control indication are separated by at least a portion of the data.

78. An access point for wireless communication, comprising:
an antenna;
a timeslot definer configured to define a receive timeslot for slotted communication; and
a receiver configured to receive, via the antenna and during the receive timeslot, signals associated with a transmit timeslot, wherein:
the transmit timeslot comprises data and at least two instances of a control indication;
each instance of the control indication is independently encoded and transmitted;
each instance of the control indication comprises an interference management indication and information that specifies a position within the timeslot at which the instance of the control indication is located;
the interference management indication indicates a degree of disadvantage that is based on a measured quality of service associated with at least one traffic flow established at an apparatus; and
the instances of the control indication are separated by at least a portion of the data.

79. An access terminal for wireless communication, comprising:
a timeslot definer configured to define a receive timeslot for slotted communication;

a receiver configured to receive, during the receive timeslot, signals associated with a transmit timeslot, wherein:
  the transmit timeslot comprises data and at least two instances of a control indication;
  each instance of the control indication is independently encoded and transmitted;
  each instance of the control indication comprises an interference management indication and information that specifies a position within the timeslot at which the instance of the control indication is located;
  the interference management indication indicates a degree of disadvantage that is based on a measured quality of service associated with at least one traffic flow established at an apparatus; and
  the instances of the control indication are separated by at least a portion of the data; and
a user interface configured to output data received by the receiver.

* * * * *